United States Patent [19]

Bailey

[11] 4,154,592
[45] May 15, 1979

[54] METHOD OF DRAWING OPTICAL FILAMENTS

[75] Inventor: Alan C. Bailey, Horseheads, N.Y.
[73] Assignee: Corning Glass Works, Corning, N.Y.
[21] Appl. No.: 879,155
[22] Filed: Feb. 21, 1978
[51] Int. Cl.² ............................................. C03B 37/00
[52] U.S. Cl. ......................................... 65/2; 65/3 A; 65/13; 65/32; 65/DIG. 7
[58] Field of Search ................... 65/2, 3 A, 12, 32, 13, 65/DIG. 7; 427/163

[56] References Cited
U.S. PATENT DOCUMENTS

| | | | |
|---|---|---|---|
| 3,540,870 | 11/1970 | Li | 65/32 X |
| 3,823,995 | 7/1974 | Carpenter | 65/32 X |
| 3,933,454 | 1/1976 | De Luca | 65/3 A X |
| 4,030,901 | 6/1977 | Kaiser | 65/13 X |

Primary Examiner—Robert L. Lindsay, Jr.
Attorney, Agent, or Firm—William J. Simmons, Jr.; Walter S. Zebrowski

[57] ABSTRACT

A method of forming an article such as an optical waveguide filament by disposing a draw blank in a cylindrical muffle. The muffle is heated to a temperature sufficient to cause a first end of the blank to reach the drawing temperature of the material thereof. A filament is drawn from the first end of the blank while a helium-containing gas flows through the muffle in such a direction that it is exhausted from that end of the muffle from which the filament is being drawn.

9 Claims, 6 Drawing Figures

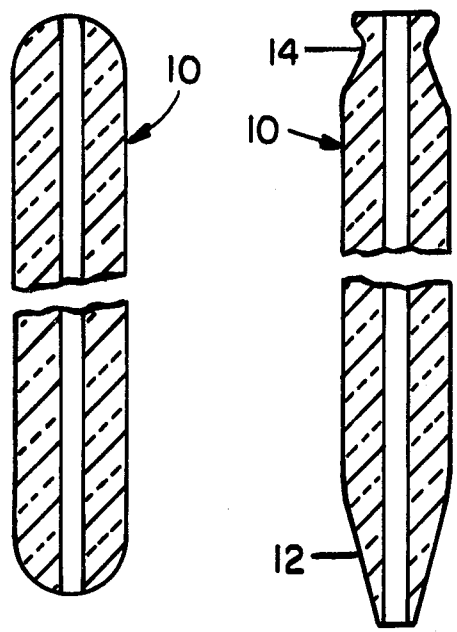
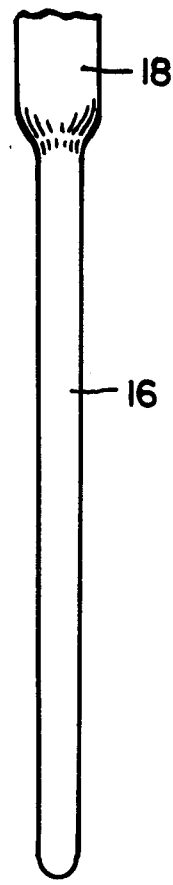
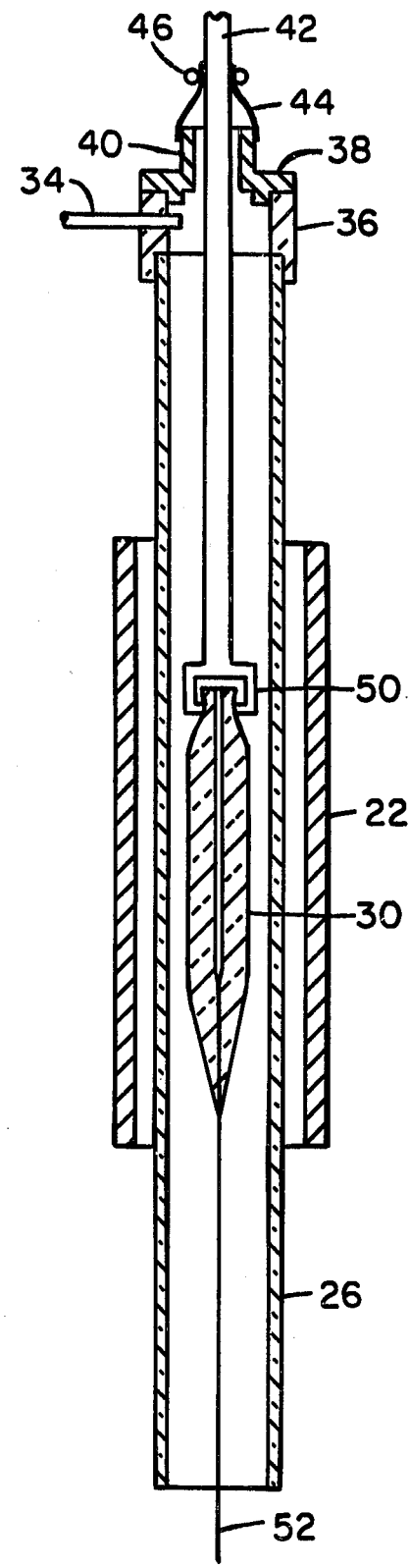
Fig. 1  Fig. 2  Fig. 3  Fig. 4

4,154,592

METHOD OF DRAWING OPTICAL FILAMENTS

BACKGROUND OF THE INVENTION

This invention relates to an improved method for drawing glass optical waveguide filaments having minimal diameter variation.

Optical waveguide filaments are a promising transmission medium recently developed for use in optical communication systems. Because of optical characteristics including but not necessarily limited to purity of materials and lack of light scattering mechanisms, e.g. core-cladding interface imperfections, low-loss light propagation over long distances is now possible. Optical waveguides suitable for use in optical communication systems can be formed by methods such as those disclosed in U.S. Pat. No. Re. 28,029 issued to D. B. Keck et al. and U.S. Pat. No. 3,823,995 issued to L. L. Carpenter.

It has been found that during the process of drawing certain optical waveguide filaments, diameter variations increased in magnitude after a portion of the draw blank had been drawn even when diameter monitoring and control apparatus was employed. While drawing filament from a blank capable of providing more than about 4 km of filament, the variation in filament diameter typically increased from about ±1 μm during the drawing of the first section of filament from the blank to about ±3 μm by the time the last km of filament was being drawn. More specifically, little or no increase in diameter change would occur until about 10 cm of blank remained. Thereafter, as the blank decreased in size below about 10 cm, the diameter variation would continue to increase to a maximum of about ±3 μm.

For various reasons it is desirable to maintain the diameter of optical waveguide filaments as close as possible to a predetermined value. As discussed in the publication "Mode-Dependent Attenuation of Optical Fibers: Excess Los" by R. Olshansky et al., *Applied Optics*, Vol. 15, p. 1045–1047, April 1976, diameter variations have been found to produce losses in optical waveguides. Moreover, when the ends of two optical waveguides are coupled together, the diameters thereof should be substantially the same to maximize the coupling of light therebetween.

SUMMARY OF THE INVENTION

It is therefore an object of the present invention to provide a method of forming optical waveguide filaments having minimal diameter variation.

Briefly, the present invention relates to a method of drawing filaments of thermoplastic material from an elongated draw blank. The draw blank is disposed in a cylindrical muffle where it is heated to a temperature sufficient to permit the drawing of a filament from a first end thereof. While the filament is being drawn, a helium-containing gas is flowed through the muffle.

BRIEF DESCRIPTION OF THE DRAWINGS

FIG. 1 is a cross-sectional view of an optical waveguide draw blank.

FIG. 2 is a cross-sectional view of a draw blank which has been flame-worked in preparation for insertion thereof into a draw furnace.

FIG. 3 is a side elevational view of a draw blank formed by a method different from that employed in the formation of the blanks of FIGS. 1 and 2.

FIG. 4 is a cross-sectional view of a portion of a draw furnace suitable for the drawing of optical waveguide filaments.

DETAILED DESCRIPTION

Figure 5:
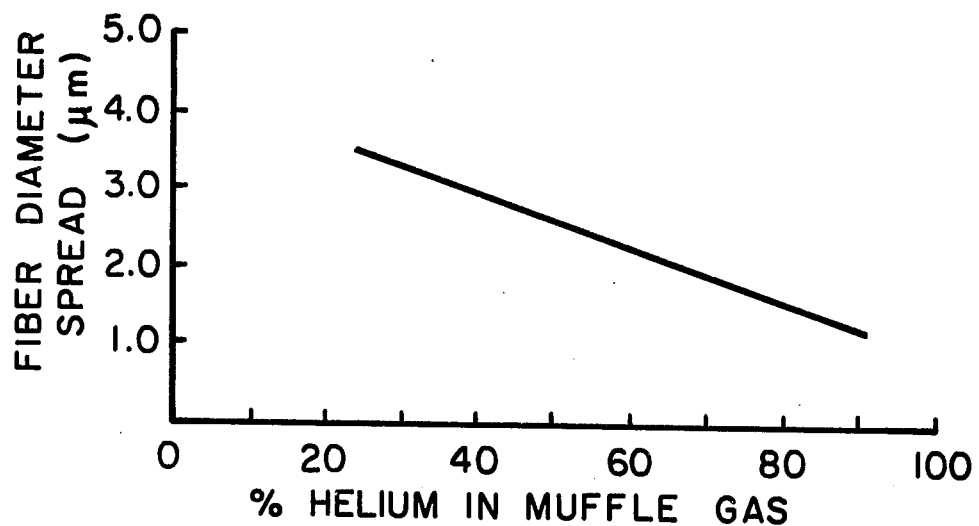
FIGS. 5 and 6 are graphs wherein fiber diameter spread is plotted as a function of percent helium in the muffle gas for data set forth in Tables I and II, respectively.

It is to be noted that the drawings are illustrative and symbolic of the present invention and there is no intention to indicate the scale or relative proportions of the elements shown therein. Although the preferred embodiments described herein relate to the drawing of glass optical waveguide filaments, the method of this invention is applicable to the drawing of filaments of other thermoplastic materials.

The present invention will be described in connection with the formation of an optical waveguide filament from flame hydrolysis-produced blanks formed in accordance with the methods of U.S. Pat. Nos. Re. 28,029 and 3,711,262, although this invention is not intended to be limited to blanks produced by these methods. In accordance with the method disclosed in U.S. Pat. No. Re. 28,029, a first coating of glass having a predetermined refractive index is formed on the outside peripheral surface of a substantially cylindrical mandrel. The refractive index of this first coating may be uniform throughout, or it may vary radially in a manner well known in the art. Thereafter, a second coating of glass is applied to the peripheral outside surface of the first coating, the second coating having a preselected index of refraction less than that of the first coating. The mandrel is removed from the assembly following the application of either the first or second coating. The resultant substantially cylindrical hollow assembly or draw blank 10 is illustrated in FIG. 1. As shown in FIG. 2 the ends of blank 10 can be flame-worked, one end 12 being tapered to facilitate the starting of the draw and the other end 14 being provided with a neck which fits into a handle.

The method described in said U.S. Pat. No. 3,711,262 differs from the previously described method in that the starting member is a tube which may become the cladding layer of the resultant optical waveguide, a film of glass of higher refractive index being formed on the inside wall of the tube to function as the core of the resultant optical waveguide. The resultant draw blank 16, which is shown in FIG. 3, is usually smaller in diameter than blanks of the type illustrated in FIGS. 1 and 2 and the center aperture is closed while the blank is on the lathe in which the tube is supported during deposition of the glass layer therein. Blank 16 is supported by a glass rod 18 during the drawing process.

Since glass layers are formed on the outer surface of a mandrel during the process of forming the draw blank of FIG. 1, that process is referred to as the outside process. The method of forming the blank of FIG. 3 is referred to as the inside process since one or more layers are formed on the inner surface of the tube.

A preferred method of forming the glass layer of the outside process is the flame hydrolysis method which is specifically described in the aforementioned U.S. Pat. No. Re. 28,029. This method results in a glass soot preform which contains water from the soot-producing flame. When the soot preform is heated to a temperature sufficient to consolidate the soot and form a homogeneous glass draw blank, the water can remain in the consolidated draw blank and cause the resultant optical waveguide to be very lossy at certain wavelengths. Various techniques have been employed to remove the water during the soot consolidation process, one being to employ helium as the consolidation atmosphere. The helium permeates the interstices of the soot preform and flushes water therefrom during the consolidation process. The resultant draw blank contains some helium and this gas must diffuse out from the draw blank during the initial portion of the drawing process. Therefore, a modification of the preferred method of the present invention will be described for use in processing helium-containing blanks. Some blanks produced by the outside process are consolidated in an atmosphere containing gases other than helium. Such helium-free blanks produced by the outside process, as well as those blanks that are produced by the inside process, can be processed by the preferred method described immediately hereinbelow.

FIG. 4 illustrates the essential portion of a draw furnace which is described in greater detail in my copending application Ser. No. 857,418, entitled "Apparatus for Minimizing Drawn Filament Diameter Variation", filed on 12/12/77.

A resistance heating element 22 surrounds muffle 26 for supplying heat thereto. A pipe 34 for supplying gas to muffle 26 extends through annular member 36 which is situated on top of muffle 26. End cap 38, which is sealed to member 36, includes a sleeve 40 through which blank support rod 42 extends. Sealing member 44 of metallic foil surrounds sleeve 40 and the adjacent portion of rod 42, to which it is sealed by O-ring 46.

Draw blank 10 is secured to rod 42 by any well known means including the slotted glass handle 50. During the process of drawing the optical waveguide filament 52, rod 42 slowly descends downwardly through muffle 26 to maintain the root portion of filament 52 and the tapered portion of blank 10 at the proper temperatures for drawing. The drawing temperature depends upon the composition of the blank, temperatures between 1600° C. and 1850° C. being common for high silica content blanks.

It has been conventional practice to flow oxygen and nitrogen down over blank 30 during the drawing process to assure oxidation of contaminants in filament 52, to control or eliminate updrafts of air which would tend to flow up through the heated muffle, and to flush out materials evolving from the heated blank and muffle. These gases are introduced through pipe 34 and into member 36, and since this end of the muffle is sealed by members 36, 38, 40 and 44, they flow down through the muffle past blank 30 and are exhausted at the bottom of the muffle.

The inside diameter of muffle 26 has conventionally been made sufficiently large as compared to the outside diameter of blank 10 that no portion of the blank can touch the muffle. Oxygen and nitrogen supplied to member 36 are heated while flowing down through the annular channel between muffle 26 and blank 30. As long as the length of the blank is greater than about 10 cm, these gases are uniformly heated so that they do not greatly affect the diameter of the filament being drawn. However, as the blank is consumed, the length of the aforementioned annular channel decreases, the gases are not heated as uniformly, and the resultant turbulence at the tip of the blank causes diameter variation to increase.

During the process of drawing optical waveguide filaments from blanks of the type illustrated in FIGS. 1, 2 and 4, filament diameter was monitored on-line with a Model SSE-5R Mil Master electronic micrometer which is capable of detecting changes of less than 0.25 $\mu$m. This monitor was part of an automatic diameter control system. The damping time constant was set at 1.0 second. Oxygen and nitrogen flowed through the muffle at a rate of 1 CFH each and the nominal filament diameter was set to 125 $\mu$m. While the length of the blank remained greater than about 10 cm, the spread in filament diameter would generally remain between 1 $\mu$m and 2 $\mu$m. However, as the blank decreased in length below about 10 cm, the diameter spread would begin to increase until it reached about 4–5 $\mu$m during the drawing of filament from the last few centimeters of blank.

Since blanks produced by the inside process, such as blank 16 of FIG. 3, are smaller in diameter than blanks produced by the outside process, drawing such smaller diameter blanks in the same muffle as a blank produced by the outside process will result in filaments having relatively large diameter variations throughout the entire length thereof.

It is thought that as the gas flows down past the blank it is heated by the muffle and rapidly expands, thereby increasing the flow rate. Thermal gradients are created in the gas, thereby resulting in small temperature variations along the tip of the in-process blank. The resulting small, rapid changes in glass viscosity change the rate of size reduction, resulting in fiber diameter variation. The small diameter variation, which occurs during the drawing of filament from a blank that is greater than 10 cm long, is probably due to the fact that the muffle gas is confined to a narrow cylindrically shaped channel between the blank and the muffle wall. As the blank is consumed, this channel becomes shorter until it is ineffective to uniformly heat the gas.

While investigating the possibility of drawing optical waveguide filaments from soot preforms that had not yet been consolidated, helium was added to the muffle gas. In addition to lowering the water content of the resultant filament, the presence of helium also unexpectedly resulted in the reduction of diameter variation. It was thought that helium, which has a thermal conductivity 4–5 times higher than conventional muffle gases, would conduct heat away from the blank and thereby adversely affect filament diameter. However, since the flow rate of gases through the muffle is relatively low, the helium is capable of stabilizing the temperature at the blank tip.

Helium was therefore added to the muffle gas during the drawing of filaments from consolidated glass blanks. Helium content was varied between 0 and 84% of the muffle gas, and total gas flow was varied between 2 and 15 CFH. The filament diameter variation was reduced by a factor of up to three times by employing a muffle gas comprising 84% helium.

The effect of varying the concentration of helium was determined by drawing optical waveguide filaments from a number of blanks. A plurality of 100 meter sections were drawn in gas mixtures having different helium concentrations.

A gradient index blank made by the aforementioned outside process was employed during draw run A. The percentage of helium was varied between 0, 33, 60 and 84% of the total muffle gas, the remainder being equal amounts of oxygen and nitrogen. Total flow of muffle gas was maintained at 5, 10 and 15 CFH while helium was employed. For comparison purposes, certain sections were drawn in a conventional atmosphere of 1 CFH oxygen and 1 CFH nitrogen. All combinations of the above mentioned gas mixtures and flows were employed, and five of them were repeated in a random sequence. Table I shows the run conditions and resultant diameter variations.

Based on data set forth in Tables I and II, the diameter variation d for a filament draw employing helium is given by the equation:

$$d = D(1 - F_{He}/F_T) + C \quad (1)$$

wherein D is the diameter obtained without the use of helium, C is a constant of process and diameter monitor-

TABLE I

| | Run No. A | | | | | |
|---|---|---|---|---|---|---|
| | Muffle Gas Conditions | | | | | |
| Reel No. | He % | O₂ % | N₂ % | Total Flow (CFH) | Diameter Spread (μm) | Length (m) | Pulling Speed (fpm) |
| 1 | 0 | 50 | 50 | 2 | 3.5 | 100m | 50 |
| 2 | 33 | 33 | 33 | 10 | 3.0 | 100 | 55 |
| 3 | 33 | 33 | 33 | 15 | 2.5 | 100 | 55 |
| 4 | 60 | 20 | 20 | 10 | 2.3 | 100 | 60 |
| 5 | 84 | 8 | 8 | 10 | 1.3 | 100 | 60 |
| 6 | 84 | 8 | 8 | 15 | 1.3 | 100 | 50 |
| 7 | 84 | 8 | 8 | 5 | 1.5 | 100 | 50 |
| 8 | 60 | 20 | 20 | 10 | 2.0 | 100 | 45 |
| 9 | 33 | 33 | 33 | 5 | 2.7 | 100 | 50 |
| 10 | 84 | 8 | 8 | 15 | 1.3 | 100 | 45 |
| 11 | 84 | 8 | 8 | 5 | 1.5 | 100 | 50 |
| 12 | 60 | 20 | 20 | 15 | 2.5 | 100 | 45 |
| 13 | 83 | 8 | 8 | 6 | 1.3 | 100 | 55 |
| 14 | 33 | 33 | 33 | 5 | 3.0 | 100 | 60 |
| 15 | 60 | 20 | 20 | 5 | 2.5 | 100 | 65 |
| 16 | 33 | 33 | 33 | 15 | 4.5 | 100 | 55 |
| 17 | 0 | 50 | 50 | 2 | 5.0 | 1113 | 60 |

Note that reels 1 and 17 employ conventional muffle gas mixtures of 1.0 CFH oxygen and 1.0 CFH nitrogen. Also, due to an error in set up, reel No. 13 employed a total flow of 6 CFH rather than 5 CFH. The graph of FIG. 5, which is based on data set forth in Table I, shows the relationship between percent helium contained in the muffle gas and filament diameter variation.

Run B, the results of which are summarized in Table II, was made to determine filament diameter variation under constant total flow while varying the percentages of helium, oxygen and nitrogen. After filament diameter became stabilized, a 100 m length of filament was wound on a reel, and thereafter, the next muffle gas composition change was made.

ing and recording equipment, $F_{He}$ is the helium flow, $F_T$ is the total flow, and the ratio $F_{He}/F_T$ is between 0 and 0.85. Equation 1 is applicable for total flows between 2 and 15 CFH. The blank diameter was 25 mm for the runs summarized in Tables I and II whereas the muffle diameter was 45 mm.

Within the range of muffle gas conditions in Run No. A, the change in total flow from 5 to 15 CFH had negligible effect on diameter variation compared with the change in helium content from 33 percent to 84 percent. However, an increase in gas flow without adding helium results in an increase in diameter variation as shown in Table II. The diameter spread increased from 2.1 μm to about 4 μm when the total flow rate of oxy-

TABLE II

| | Run No. B | | | | | |
|---|---|---|---|---|---|---|
| | Muffle Gas Conditions | | | | | |
| Reel No. | He % | O₂ % | N₂ % | Total Flow (CFH) | Diameter Spread (μm) | Length (m) | Pulling Speed (fpm) |
| — | 0 | 50 | 50 | 2 | 2.1 | 100 | 45 |
| 1 | 0 | 0 | 100 | 10 | 3.0 | 100 | 40 |
| 2 | 75 | 25 | 0 | 10 | 0.7 | 100 | 65 |
| 3 | 72 | 14 | 14 | 10 | 1.0 | 100 | 60 |
| 4 | 50 | 50 | 0 | 10 | 2.0 | 100 | 60 |
| 5 | 0 | 50 | 50 | 10 | 4.2 | 100 | 55 |
| 6 | 50 | 50 | 0 | 10 | 1.5 | 100 | 55 |
| 7 | 17 | 83 | 0 | 10 | 3.0 | 100 | 50 |
| 8 | 37 | 63 | 0 | 10 | 2.5 | 100 | 60 |
| 9 | 83 | 17 | 0 | 10 | 1.5 | 100 | 75 |
| 10 | 50 | 50 | 0 | 10 | 2.0 | 100 | 60 |
| 11 | 0 | 100 | 0 | 10 | 4.0 | 100 | 60 |
| 12 | 0 | 50 | 50 | 10 | 4.0 | 100 | 60 |
| 13 | 33 | 33 | 33 | 10 | 2.5 | 100 | 55 |
| 14 | 50 | 0 | 50 | 10 | 1.5 | 100 | 55 |
| 15 | 75 | 25 | 0 | 10 | 0.8 | 100 | 70 |

Figure 6:
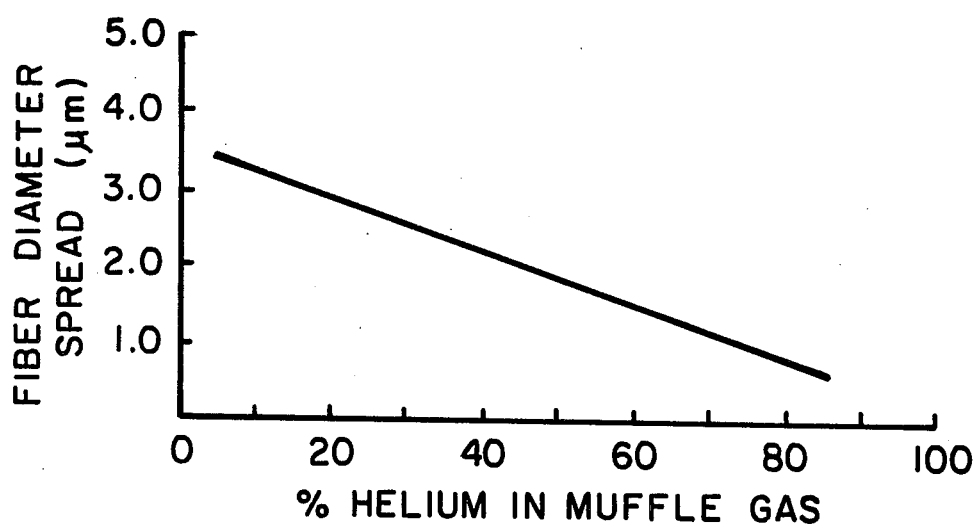

The graph of FIG. 6 illustrates the relationship between percent helium in the muffle gas and filament diameter spread for Run B. It can be seen that diameter variation can be reduced by a factor of about two by employing a muffle gas comprising 50% helium.

gen and nitrogen was increased from 2 CFH to 10 CFH between the standard condition of the first line of Table II and reels 5 and 12.

The results of a further plurality of runs appear in Table III.

TABLE III

| Run No. | Blank Type | Reel No. | He % | Fiber Dia. Spread | Nominal Fiber Dia. | Lgth | Loss at 820nm |
| --- | --- | --- | --- | --- | --- | --- | --- |
| C | Step Index Outside Process | 1 | 0 | 3.0μm | 125μm | 1315m | 6.6dB/km |
|  |  | 2 | 0 | 3.5 | 125 | 1315 | 4.4 |
|  |  | 3 | 60 | 1.0 | 125 | 1315 | 4.5 |
| D | Graded Index Outside Process | 1 | 0 | 2.5μm | 125μm | 1015m | 7.8 |
|  |  | 2 | 0 | 2.0 | 125 | 1015 | 7.7 |
|  |  | 3 | 0 | 2.5 | 125 | 1015 | 11.4 |
|  |  | 5 | 75 | 1.5 | 125 | 1015 | 9.4 |
| E | Graded Index Outside Process | 2 | 0 | 2.5μm | 125μm | 1115m | 6.1 |
|  |  | 3 | 0 | 2.5 | 125 | 1115 | 6.6 |
|  |  | 5 | 0 | 3.5 | 125 | 1240 | 6.9 |
|  |  | 7 | 75 | 1.5 | 125 | 1115 | 8.1 |
|  |  | 8 | 75 | 1.5 | 125 | 1650 | 10.1 |
| F | Graded Index Inside Process | 1 | 0 | 4.5μm | 115μm | 1015m | 10.5 |
|  |  | 2 | 60 | 1.5 | 115 | 1015 | 8.7 |

In runs C through F the oxygen and nitrogen levels were maintained at 1.0 CFH each and helium was added to provide the indicated helium percentage. In each of these runs only a single helium level was employed, and each reel contained more than one kilometer of filament. A significant reduction in filament diameter variation is indicated, such variation being reduced by a factor of two to three by employing a muffle gas containing 60 to 75 percent helium.

As the muffle gas flows through the channel between the in-process draw blank and the muffle it is heated by the muffle. It appears that the gas is more uniformly heated if it has a relatively high thermal conductivity and as the channel thickness descreases. When thermal gradients exist in the muffle gas in the vicinity of the tip of the draw blank, the resultant rapid changes viscosity of the blank material result in filament diameter variation. It appears that the addition of helium to the muffle gas reduces thermal gradients due to the fact that the thermal conductivity of helium is about five times greater than that of oxygen and nitrogen.

The adverse effect of channel thickness is evident from Table III wherein Run No. F employed a blank formed by the inside process. The small diameter of the blank, viz. 10 mm, as compared with the 45 mm inside diameter of the muffle, left a very large channel through which the muffle gas flowed. The conventional muffle gas flowing near the surface of the blank therefore was not heated to nearly as high a temperature as the gas flowing adjacent to the muffle wall. The diameter spread was therefore relatively large, i.e. 4.5 μm for a nominal diameter of 125 μm when the muffle gas consisted of 1.0 CFH oxygen and 1.0 CFH nitrogen. Under such conditions, the addition of helium to the muffle gas has been found to be very beneficial, the diameter variation decreasing to 1.5 μm when helium was added to the extent that it comprised 60 percent of the total muffle gas.

If a draw blank is formed by the outside process whereby glass soot is deposited upon the outside surface of a rotating mandrel, and the resultant soot preform is consolidated in a helium-containing atmosphere, the initial portion of the draw should be performed in the absence of helium so that any helium in the draw blank will diffuse out of the blank. The time required for such diffusion to take place depends upon such parameters as draw temperature and diameter of the blank. It has been found that during the consolidation of conventional blanks produced by the outside process which are capable of providing about 10 kilometers of filament, the draw blank is substantially helium-free after about one half of the blank has been drawn in an atmosphere containing only nitrogen and oxygen. Thereafter, helium can be employed during the drawing of the remaining five kilometers of filament from the blank. As mentioned hereinabove, filament diameter spread can increase during the drawing of filament from the last 10 cm of blank. However, if helium is employed during the latter part of the blank drawing operation, diameter spread can be maintained at a low value.

Although the method of the present invention has been described by specifically referring to the drawing of blanks formed by the aforementioned inside and outside processes, it is not intended that the present invention be limited to the use of such blanks. For example, another well known technique for forming filaments involves the insertion of a rod of a first transparent material into a tube of a second transparent material having a lower refractive index than the first material. Moreover, the material from which the filaments are made may consist of glass, plastic or the like.

I claim:

1. The method of drawing filaments of thermoplastic material from an elongated draw blank comprising the steps of:

disposing said blank in a cylindrical muffle, heating said muffle to a temperature sufficient to cause a first end of said blank to reach the drawing temperature of the material thereof, drawing a filament from said first end of said blank, and flowing helium-containing gas through said muffle during at least a portion of said drawing step, said gas containing an amount of helium sufficient to reduce variations in filament diameter.

2. A method in accordance with claim 1 wherein the step of flowing a helium-containing gas through said muffle comprises flowing a helium-free gas through said muffle until about 10 cm of said draw blank remains, and thereafter flowing helium-containing gas through said muffle.

3. A method in accordance with claim 2 wherein said helium-containing gas contains up to 84 percent helium.

4. A method in accordance with claim 3 wherein said helium-containing gas flows at a rate up to 15 CFH.

5. A method in accordance with claim 4 wherein said helium-containing gas consists of helium, oxygen and nitrogen.

6. A method in accordance with claim 1 wherein said helium-containing gas comprises up to 84 percent helium.

7. A method in accordance with claim 6 wherein said helium-containing gas flows through said muffle at a rate of up to 15 CFH.

8. A method in accordance with claim 7 wherein said helium-containing gas consists of helium, oxygen and nitrogen.

9. A method in accordance with claim 1 wherein the step of disposing comprises disposing a helium-containing blank in a cylindrical muffle and wherein the step of flowing comprises flowing a helium-free gas through said muffle until said blank is substantially helium-free and thereafter flowing a helium-containing gas through said muffle.

* * * * *